(12) United States Patent
Holmes

(10) Patent No.: US 9,334,112 B2
(45) Date of Patent: May 10, 2016

(54) PHARMACEUTICAL STORAGE AND RETRIEVAL SYSTEM

(71) Applicant: RXSAFE LLC, San Marcos, CA (US)

(72) Inventor: William K. Holmes, San Diego, CA (US)

(73) Assignee: RxSafe, LLC, San Marcos, CA (US)

( * ) Notice: Subject to any disclaimer, the term of this patent is extended or adjusted under 35 U.S.C. 154(b) by 0 days.

(21) Appl. No.: 14/471,093

(22) Filed: Aug. 28, 2014

(65) Prior Publication Data

US 2014/0367221 A1 Dec. 18, 2014

Related U.S. Application Data

(62) Division of application No. 13/655,089, filed on Oct. 18, 2012, now Pat. No. 8,849,445.

(60) Provisional application No. 61/548,439, filed on Oct. 18, 2011.

(51) Int. Cl.
*G06F 7/00* (2006.01)
*B65G 1/04* (2006.01)
*G07F 17/00* (2006.01)
*G07F 11/60* (2006.01)

(52) U.S. Cl.
CPC *B65G 1/04* (2013.01); *G07F 11/60* (2013.01); *G07F 17/0092* (2013.01)

(58) Field of Classification Search
None
See application file for complete search history.

(56) References Cited

U.S. PATENT DOCUMENTS

| 5,152,422 | A | * | 10/1992 | Springer | A61J 7/0084 221/113 |
| 5,502,944 | A | * | 4/1996 | Kraft | G07F 17/0092 221/2 |
| 5,720,154 | A | * | 2/1998 | Lasher | G07F 5/18 53/168 |
| 7,228,198 | B2 | | 6/2007 | Vollm et al. | |
| 2002/0173875 | A1 | * | 11/2002 | Wallace | G06F 19/322 700/242 |
| 2005/0049746 | A1 | * | 3/2005 | Rosenblum | G06F 19/3462 700/232 |
| 2011/0054668 | A1 | | 3/2011 | Holmes et al. | |
| 2011/0184751 | A1 | | 7/2011 | Holmes | |

* cited by examiner

*Primary Examiner* — Yolanda Cumbess
(74) *Attorney, Agent, or Firm* — Michael Best & Friedrich LLP

(57) ABSTRACT

A storage and retrieval system includes a casing having an interior storage area and a staging area, a plurality of containers positioned in the interior storage area, and a gantry assembly positioned within the casing. The gantry assembly is operable to move each of the plurality of containers between the interior storage area and the staging area. The staging area simultaneously receives and supports more than one container to allow access to the more than one container.

20 Claims, 7 Drawing Sheets

PHARMACEUTICAL STORAGE AND RETRIEVAL SYSTEM

CROSS-REFERENCE TO RELATED APPLICATIONS

This application is a divisional of U.S. patent application Ser. No. 13/655,089, filed Oct. 18, 2012, which claims priority to U.S. Provisional Patent Application No. 61/548,439, filed Oct. 18, 2011, the entire contents of both of which are incorporated by reference herein.

BACKGROUND

The present invention relates to systems for storing and retrieving items, such as pharmaceuticals.

Facilities such as nursing homes typically include a large variety of different drugs and other narcotics. These drugs, however, are typically stored in unsecured locations, such as closets, boxes, cupboards, or shelves. Such arrangements may leave the drugs disorganized, liable to be lost or misplaced, and even susceptible to theft.

SUMMARY

In one embodiment, the invention provides a storage and retrieval system including a casing having an interior storage area and a staging area, a plurality of containers positioned in the interior storage area, and a gantry assembly positioned within the casing. The gantry assembly is operable to move each of the plurality of containers between the interior storage area and the staging area. The staging area simultaneously receives and supports more than one container to allow access to the more than one container.

In another embodiment, the invention provides a storage and retrieval system including a casing having an interior storage area and a staging area, and a plurality of containers positioned in the interior storage area. Each container includes a lock mechanism. The system also includes a gantry assembly positioned within the casing. The gantry assembly is operable to move each of the plurality of containers between the interior storage area and the staging area. The system further includes an actuator mounted to the casing adjacent the staging area. The actuator is operable to unlock the lock mechanism of each container when the container is positioned in the staging area.

In yet another embodiment, the invention provides a storage and retrieval system including a casing having an interior storage area and a staging area, a plurality of containers positioned in the interior storage area, and a gantry assembly positioned within the casing. The gantry assembly is operable to move each of the plurality of containers between the interior storage area and the staging area. The plurality of containers is accessible to a user when positioned in the staging area. A portion of each container is engaged by the casing to inhibit removal of the container from the casing through the staging area.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
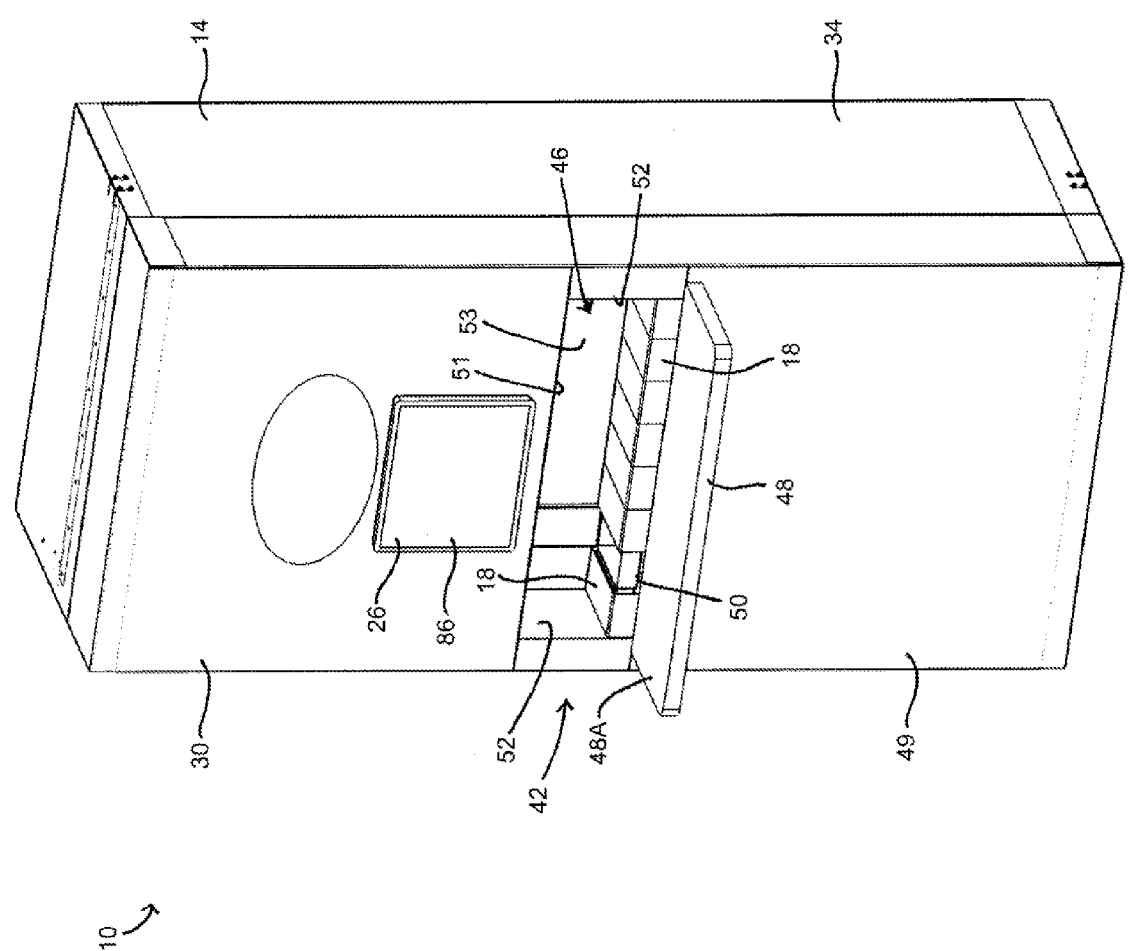
FIG. 1 is a perspective view of a pharmaceutical storage and retrieval system according to one embodiment of the invention.
Figure 2:
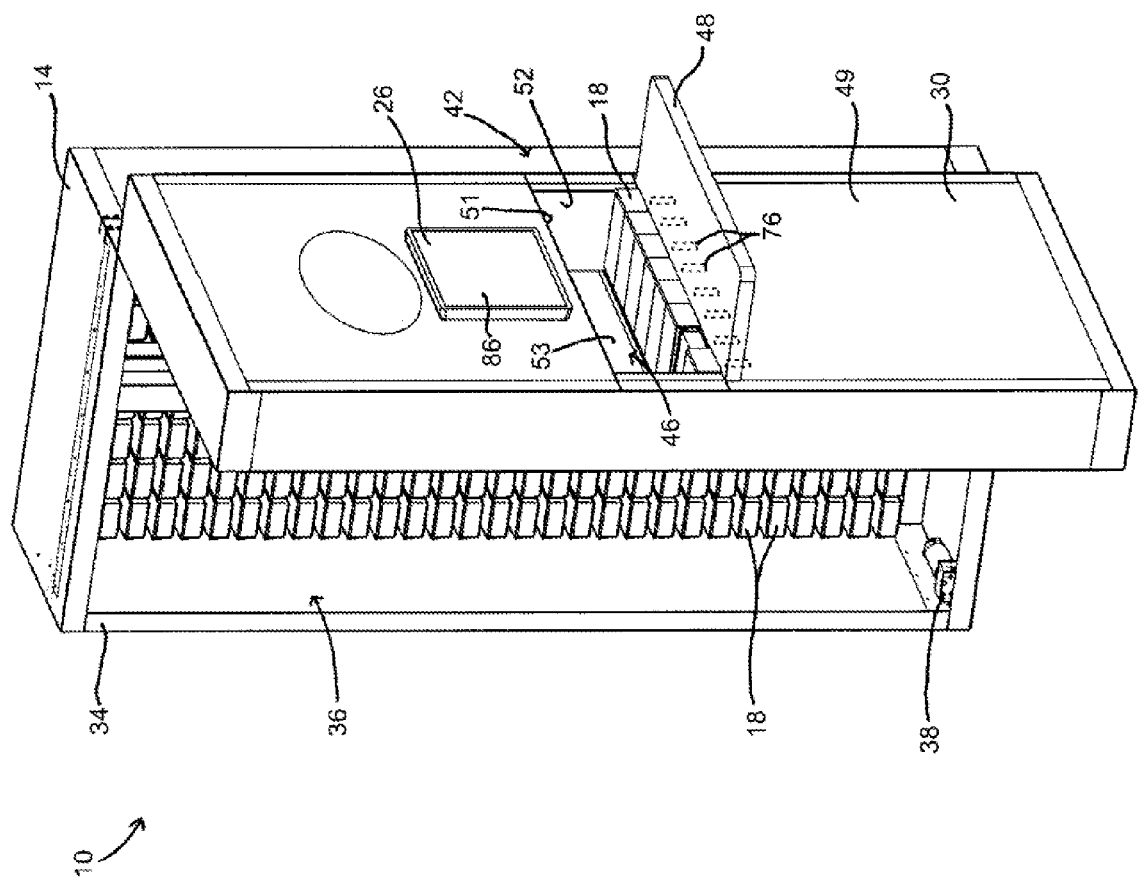
FIG. 2 is a perspective view of the pharmaceutical storage and retrieval system of FIG. 1 in an open position.
Figure 3:
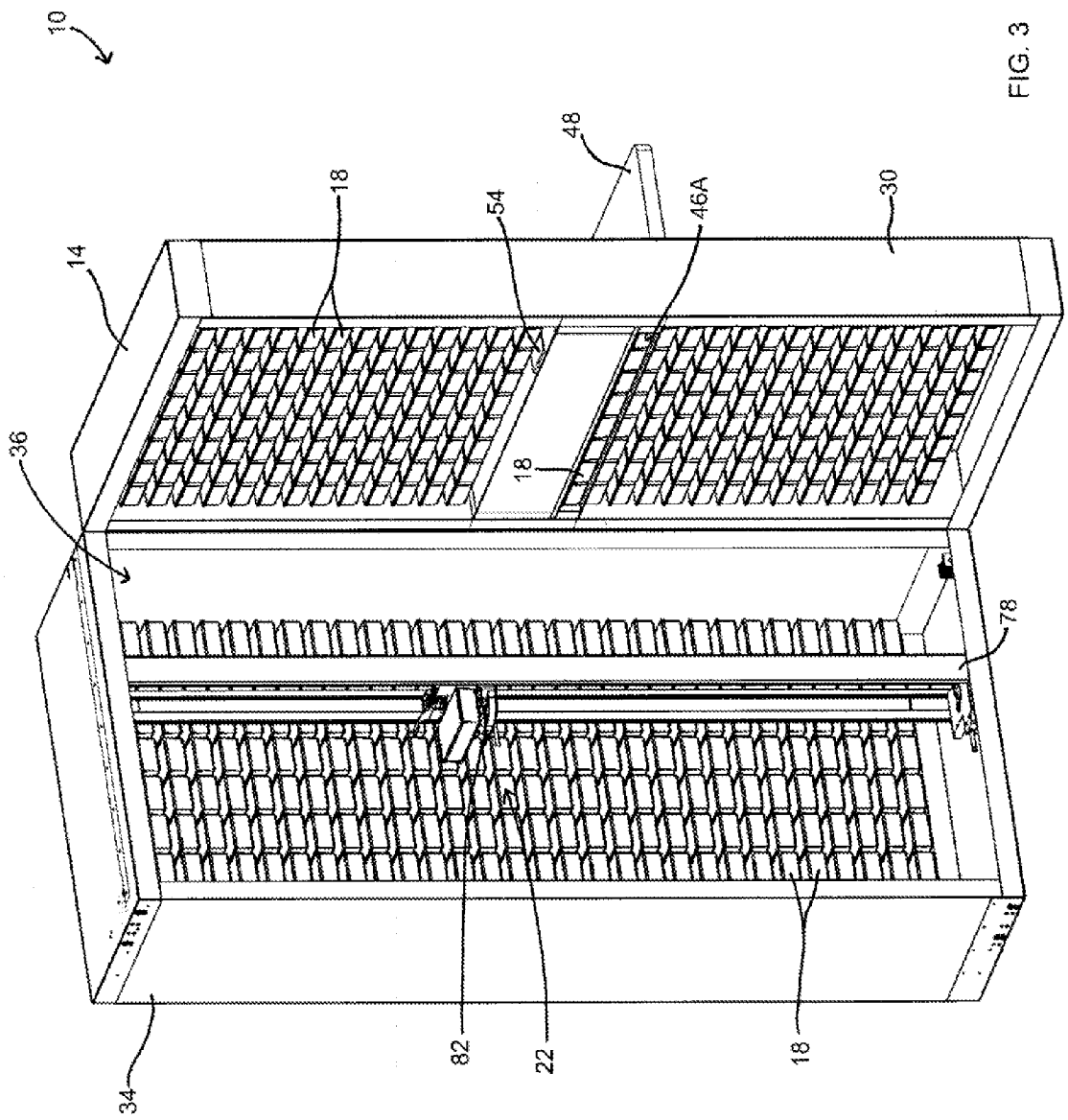
FIG. 3 is a perspective view of an interior storage area of the pharmaceutical storage and retrieval system of FIG. 1.

FIGS. 1-3 illustrate a pharmaceutical storage and retrieval system 10 embodying the invention. The illustrated system 10 is a self-contained, automated system that dispenses pharmaceuticals (e.g., pills, drugs, and other medications) at an on-site location. For example, the system 10 may be installed in a nursing home, hospice, hospital, or other location where pharmaceuticals are used. The illustrated system 10 is compact to fit in a relatively small area such as, for example, a closet. The system 10 is designed to securely store a variety of pharmaceuticals, track the amount of pharmaceuticals being stored, track when the pharmaceuticals are accessed, and dispense the pharmaceuticals to a user when needed.

The illustrated system 10 includes a casing 14, a plurality of containers 18, a gantry assembly 22 (FIG. 3), and a user interface 26. The casing 14 includes a first, or front, portion 30 and a second, or rear, portion 34. The casing portions 30, 34 are hingedly coupled together such that the casing 14 may be opened to access an interior storage area 36 of the system 10. In the illustrated embodiment, the front portion 30 swings open relative to the rear portion 34 like a door. In other embodiments, the front portion 30 may slide or lift open to provide access to the interior of the system 10. When the front portion 30 is closed (FIG. 1), the casing 14 acts as a safe to prevent unauthorized access to the pharmaceuticals stored within the system 10.

A locking mechanism 38 selectively locks the front portion 30 to the rear portion 34 and inhibits unauthorized opening of the casing 14. In the illustrated embodiment, the locking mechanism 38 is mounted toward the bottom of the rear portion 34. In some embodiments, the locking mechanism 38 may be actuated (e.g., locked and unlocked) by interacting with the user interface 26. In other embodiments, the locking mechanism 38 may be manually actuated by a key or other device.

As shown in FIGS. 2 and 3, the containers 18 are arranged in a plurality of rows and a plurality of columns in the interior storage area 36 of the casing 14. The illustrated containers 18 are bins or boxes that are uniformly shaped and sized to store pharmaceuticals. In some embodiments, each of the containers 18 may be filled with a single type of pharmaceutical. In other embodiments, each container 18 may correspond to a particular patient and only be filled with pharmaceuticals for that patient. In the illustrated embodiment, each of the containers 18 is rectangular and may be, for example, approximately 2 inches tall, approximately 4 inches wide, and approximately 8 inches long to hold a suitable supply of pharmaceuticals. In other embodiments, the containers 18 may have other suitable shapes and/or sizes.

In the illustrated embodiment, the containers 18 are arranged in a single layer on both sides (i.e., portions 30, 34) of the casing 14 such that every container 18 is always accessible to the gantry assembly 22. In other embodiments, the containers 18 may be arranged on only one side of the casing 14, as dictated by the required system capacity. Each container 18 is located at and corresponds to a specific position in the array of rows and columns. Each of the positions is defined by a slot configured to receive the container 18. In some embodiments, the containers 18 may be supported in the slots by tabs or strips coupled to and extending from an inner surface of each casing portion 30, 34. In other embodiments, the containers 18 may be supported by shelves, hooks, or other suitable support structures.

In further embodiments, the location of each container 18 may not be limited to a specific slot within the casing 14. Rather, each container 18 may be positioned in any open slot and its location may be tracked by the user interface 26. In such embodiments, the casing 14 may provide random storage for the containers 18 (i.e., each container 18 does not have a predetermined set or home location within the casing 14). In addition, the user interface 26 may track which containers 18 are requested most often and move those containers 18 into slots located to reduce movements of the gantry assembly 22.

Referring back to FIG. 1, the casing 14 includes a staging area 42. The staging area 42 can simultaneously support and receive more than one container 18 to allow a user to access the containers 18 supported therein. The illustrated staging area 42 is formed on the front portion 30 of the casing 14 and includes a recess 46 and a shelf 48. The recess 46 is formed in an outer surface 49 of the casing 14 and is defined by a lower surface 50, an upper surface 51, two opposing side surfaces 52, and a recessed surface 53. The recess 46 communicates with the interior storage area 36 through an opening 46A (FIG. 3) formed in the recessed surface 53. The opening 46A allows the gantry assembly 22 to move the containers 18 into and out of the staging area 42.

The staging area 42 supports the containers 18 within the recess 46 on the lower surface 50. In the illustrated embodiment, the staging area 42 is configured to simultaneously receive and support eight containers 18. In other embodiments, the staging area 42 may receive and support fewer or more containers 18. When in the staging area 42, the containers 18 are arranged side-by-side in a single layer (e.g., in a row or line) between the opposing side surfaces 52 such that each container 18 is independently accessible without interfering with another container 18. The illustrated recess 46 is deep enough so each container 18 is maintained within a periphery of the system 10 defined by the casing 14. That is, front ends of the containers 18 do not extend beyond the outer surface 40 of the casing 14 while the containers 18 are seated on the lower surface 50. In addition, the recess 46 is tall enough so each container 18 can open without interference from the upper surface 51 while the containers 18 are seated on the lower surface 50.

The recess 46 positions the containers 18 outside of the interior storage area 36 of the casing 14, allowing a user to open the containers 18 and access the pharmaceuticals inside. By supporting more than one container 18 at a time, the staging area 42 reduces the possibility of creating a bottleneck while waiting for the gantry assembly 22 to move the containers 18 within the system 10. In addition, simultaneously supporting multiple containers 18 in the staging area 42 allows a user to access more than one container 18 at a time. For example, if a patient requires a variety of different drugs that are stored in different containers 18, the staging area 42 can support all or some of the containers 18 that contain the desired drugs. A user can thereby retrieve the drugs from the corresponding containers 18 without waiting for each container 18 to be successively moved into an accessible position. That is, the user does not have to wait for the containers 18 to be moved one at a time (i.e., a first container to be moved out of the storage area 36, the first container to be returned to the storage area 36, a second container to be moved out of the storage area 36, and so on) in order to access two or more containers 18.

The shelf 48, or counter, extends outwardly from the casing 14 adjacent the recess 46. The shelf 48 is generally planar and provides a work surface for a user accessing the containers 18. As shown in FIG. 1, an upper surface 48A of the shelf 48 is generally inline or continuous with the lower surface 50 of the recess 46. In the illustrated embodiment, the shelf 48 extends the length of the recess 46. In other embodiments, the shelf 48 may have other shapes, sizes, or configurations suitable for providing a work surface adjacent the containers 18 in the recess 46.

In some embodiments, the staging area 42 may be configured to inhibit removal of the containers 18 from the system 10 through the staging area 42. In such embodiments, the containers 18 may be physically held in place when the containers 18 are positioned in the recess 46. For example, mechanical or electronic latches may engage the containers 18 to secure the containers 18 in place within the staging area 42. Additionally or alternatively, the recess 46 may be physically shaped and sized to inhibit a user from pulling any of the containers 18 out of the staging area 42. In other embodiments, the containers 18 may be removable from the system 10 through the staging area 42.

As shown in FIG. 3, a sensor 54 is mounted to the casing 14 adjacent the staging area 42. The sensor 54 may be, for example, a barcode scanner or an RFID reader. The sensor 54 identifies each container 18 as the container 18 is moved between the storage area 36 and the staging area 42. In the illustrated embodiment, the system 10 includes one sensor 54 to monitor and identify all of the containers 18 moving into and out of the staging area 42. In other embodiments, the system 10 may include multiple sensors 54 (e.g., eight sensors) such that one sensor corresponds to each container 18 positioned in the staging area 42. In some embodiments, the containers 18 may be composed of an opaque material, such as metal or colored plastic. In such embodiments, each container 18 may include a unique identifier (e.g., a barcode, an RFID tag, etc.) to identify the particular container 18 and the contents inside the container 18. In other embodiments, the container 18 may be composed of a transparent material, such as colored plastic. In such embodiments, identifiers on the items inside the container 18 may be directly read, scanned, or sensed by a user or the sensor 54.

Figure 4:
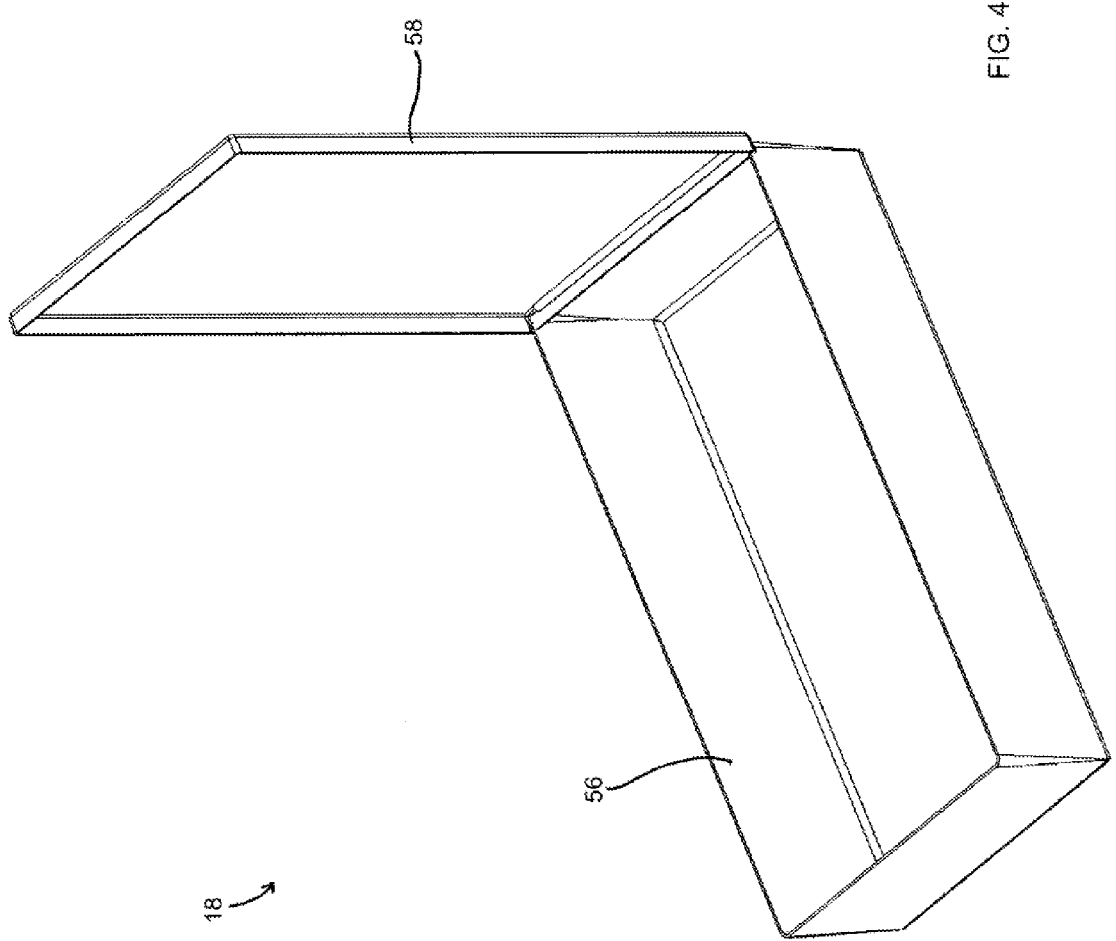
FIG. 4 is a perspective view of a container for use with the pharmaceutical storage and retrieval system of FIG. 1.
Figure 5:
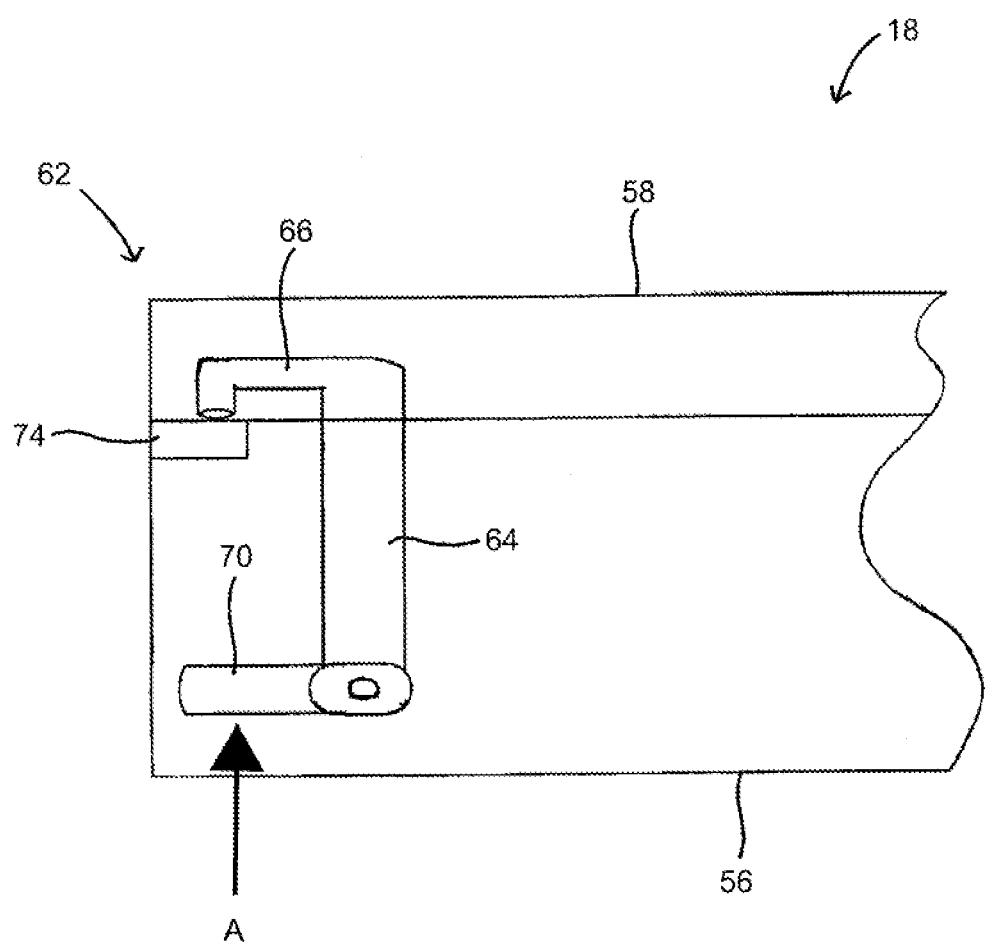
FIG. 5 schematically illustrates a lock mechanism for use with the container shown in FIG. 4.

FIGS. 4 and 5 illustrate one of the containers 18, or bins, in more detail. The illustrated container 18 includes a base portion 56 and a lid 58. The lid 58, or cover, is pivotable relative to the base portion 56 between an open position (FIG. 4) and a closed position (FIG. 5). When the container 18 is being stored in the casing 14 or being retrieved by the gantry assembly 22, the container 18 is normally closed. The container 18 is selectively opened when positioned in the staging area 42 to provide access to the pharmaceuticals stored therein. In some embodiments, the lid 58 may be biased (e.g., spring-loaded) to the open position such that the lid 58 automatically opens when the container 18 is in the staging area 42. In other embodiments, the lid 58 may be manually pivoted between the open and closed positions.

As shown in FIG. 5, the illustrated container 18 also includes a lock mechanism 62 to selectively secure the lid 58 in the closed position. As shown in FIG. 5, the lock mechanism 62 includes a latch 64 having a first arm 66 and a second arm 70. The first arm 66 engages a portion 74 (e.g., a lip or projection) of the lid 58 to secure the lid 58 in the closed position. The second arm 70 is selectively engageable by an actuator 76 (FIG. 2), such as a solenoid, to move the first arm 66 out of engagement with the lid 58. For example, a biasing member, such as a coil spring, may bias the first arm 66 into engagement with the portion 74, and the actuator 76 may push the second arm 70 at arrow A against the force of the biasing member to pivot the first arm 66 away from the portion 74 of the lid 58. In other embodiments, the lids 58 of the containers 18 may be releasably secured in the closed position with magnetic- or electronic-type locks or couplings.

The illustrated lock mechanism 62 inhibits the container 18 from being opened if the container 18 is removed from the system 10. For example, some containers 18 may occasionally be removed from the system 10 for transporting to another similar system. Alternatively, the containers 18 may be temporarily removed from the system 10 for restocking at a remote facility. In some embodiments, the lock mechanism 62 may also be tamper evident such that it is noticeable if a person tried to force open the container 18 without properly unlocking the lock mechanism 62.

Referring back to FIG. 2, the illustrated system 10 includes eight actuators 76 corresponding to the eight containers 18 positioned in the staging area 42. The actuators 76 are mounted inside the casing 14 adjacent the staging area 42 to actuate the lock mechanisms 62 and unlock the containers 18 when the containers 18 are positioned in the recess 46. Each of the actuators 76 is independently actuatable such that the containers 18 may be independently unlocked. In other embodiments, the system 10 may include a single actuator that is movable within the casing 14 to independently unlock each of the containers 18 or to unlock all of the containers 18 simultaneously. In further embodiments, the lock mechanisms 62 of the containers 18 may be omitted. In such embodiments, access to the pharmaceuticals inside the containers 18 may be regulated by the user interface 26, as further described below.

As shown in FIG. 3, the gantry assembly 22 is positioned within the casing 14. In some embodiments, the gantry assembly 22 is the gantry assembly disclosed in U.S. application Ser. No. 12/870,045, filed Aug. 27, 2010, the entire contents of which are incorporated by reference herein. The illustrated gantry assembly 22 includes a track 78 and a carriage assembly 82 operable to move along the track 78 to retrieve the containers 18. The track 78 is movable horizontally within the casing 14 to align the carriage assembly 82 with a specific column of containers. The carriage assembly 82 is movable vertically along the track 78 to align with a specific row of containers. When the carriage assembly 82 is aligned with the desired container, the carriage assembly 82 grabs the container 18 and carries the container 18 to the staging area 42. Similarly, the carriage assembly 82 can grab one of the containers 18 from the staging area 42 and return the container 18 to the proper column and row in the storage area 36.

The user interface 26 is coupled to the gantry assembly 22 and the actuators 76 to allow a user to access the pharmaceuticals stored in the containers 18. The interface 26 includes a processor, a memory, and a screen 86. The memory includes a patient database and a pharmaceutical database. The patient database stores, for example, names and prescribed pharmaceuticals for each patient entered into the interface 26 (e.g., for patients currently staying at the facility where the system 10 is installed). The pharmaceutical database stores, for example, the type, the amount, and the location (e.g., the container 18) of each pharmaceutical currently stored within the system 10. In the illustrated embodiment, the screen 86 is a touch screen that allows a user to interact with the system 10. In some embodiments, the interface 26 may also include a keyboard. The illustrated screen 86 is coupled to the front portion 30 of the casing 14 adjacent the staging area 42. In other embodiments, the user interface 26 may be remote from the casing 14, but coupled to the system 10 via a wired or wireless connection.

When a user (e.g., a nurse, a doctor, or other healthcare provider) needs a particular pharmaceutical for a patient, the user logs onto the system 10 through the user interface 26. In some embodiments, the user may login via an ID code, a password, and/or a biometric identifier. The user then inputs the name of the patient, the requested pharmaceutical, and the amount of the pharmaceutical needed. In some embodiments, the names of patients and their associated pharmaceuticals may be displayed in lists on the screen 86. In other embodiments, the user may type in the patient name and/or the pharmaceutical name. For prescription drugs, the user interface 26 can check the patient database to verify that the requested drug is prescribed to the patient. If the requested drug is not prescribed to the particular patient, the system 10 may deny access to the drug. For example, the user interface 26 may refuse to operate the gantry assembly 22 to move the corresponding container 18 to the staging area 42 or may refuse to operate the actuator 76 to unlock the container 18. In addition, if the system 10 is currently out of or running low on the requested pharmaceutical, the system 10 may notify the user to order more of the pharmaceutical.

Once the patient and pharmaceutical names are entered, the gantry assembly 22 moves within the casing 14 to the container 18 storing the requested pharmaceutical. The gantry assembly 22 then grabs the container 18 and moves the container 18 to the staging area 42. When the container 18 is positioned at the staging area 42, the actuator 76 is actuated by the interface 26 to unlock the latch mechanism 62 and open the lid 58. The user can then remove the appropriate amount of pharmaceuticals from the container 18. In some embodiments, the user may enter the amount (e.g., volume, weight, number, etc.) of pharmaceuticals removed from the container 18 and/or the amount of pharmaceuticals remaining in the container 18 into the interface 26. In other embodiments, the user may enter the requested amount of pharmaceuticals into the interface 26 before the container 18 is moved to the staging area 42 and opened.

When the user is finished with the container 18, the user closes the lid 58. In some embodiments, a sensor may be positioned in the staging area 42 or on each container 18 to monitor the position of the lid 58. When the lid 58 is closed, the gantry assembly 22 can automatically grab the container 18 and return the container 18 to the appropriate row and column in the casing 14. The gantry assembly 22 can then move another container 18 to the staging area 42 or wait for further instructions from the user interface 26.

The system 10 provides a secure location to store a large and diverse volume of pharmaceuticals in an organized manner. The system 10 keeps track of the amount of each pharmaceutical stored in the system so that users know when to request additional prescriptions from a pharmacist. For example, the initial volume of each pharmaceutical stored in the system 10 can be programmed into the user interface 26.

The interface 26 can then track when pharmaceuticals are removed from and added to the containers 18. In addition, the system 10 monitors who is accessing the pharmaceuticals in order to deter theft. If desired, in some embodiments, the system 10 can also require a second user to login and attest to the dispensing of certain pharmaceuticals such as, for example, narcotics. Furthermore, the system 10 monitors which pharmaceuticals are being used by which patients to help properly charge each of the patients. The system 10 can thereby generate and provide robust reports for inventory use and for Medicare, Medicaid, or other insurance billing.

In some embodiments, the system 10 may communicate with one or more pharmacies via the internet or a cellular network. In such embodiments, the system 10 can compare the amount of each pharmaceutical needed for the patients in the patient database with the amount of each pharmaceutical currently stored in the containers 18. When a supply of one pharmaceutical runs low, the system 10 can automatically notify a pharmacy to restock the pharmaceutical. In addition, when a new patient is entered into the system 10, the system 10 can compare the new patient's prescribed drugs with the drugs currently stored in the system 10. If necessary, the system 10 can automatically request additional pharmaceuticals from a pharmacy for the new patient.

In further embodiments, the system 10 may also communicate with a central server via the internet or a cellular network. In such embodiments, multiple systems 10 may all communicate with the same server. The server can monitor the amount of pharmaceuticals in each system 10 and notify a user (e.g., via email, text message, etc.) when particular pharmaceuticals need to be reordered. In addition, the server can track expiration dates of certain pharmaceuticals or recognize when a particular pharmaceutical is recalled or tainted. In such situations, the server can send messages to all of the connected systems 10 to quarantine the containers 18 containing these pharmaceuticals until the pharmaceuticals are properly disposed.

Figure 6:
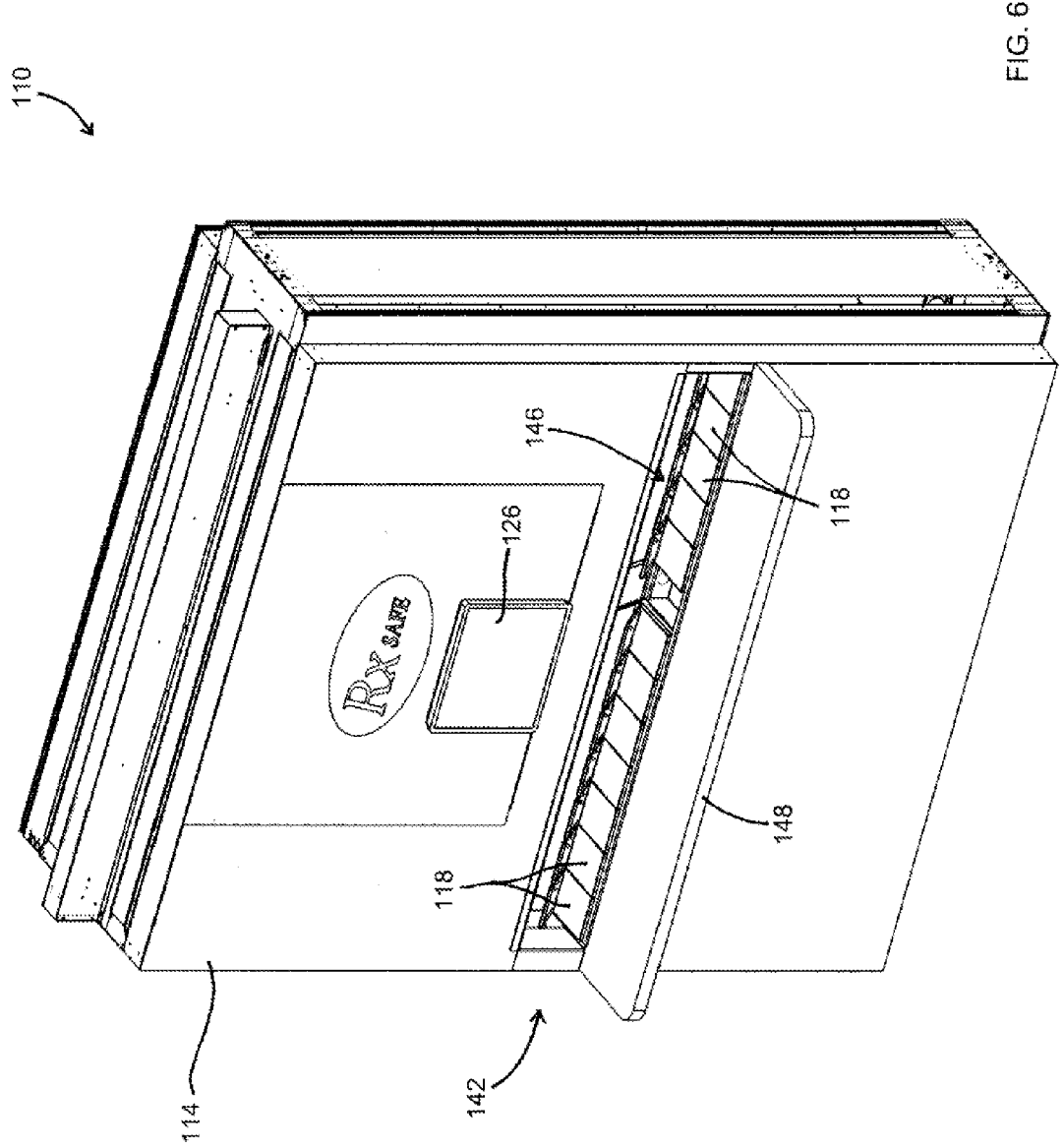
FIG. 6 is a perspective view of another pharmaceutical storage and retrieval system.

FIG. 6 illustrates another pharmaceutical storage and retrieval system 110. The illustrated system 110 is similar to the system 10 discussed above and includes a casing 114, a plurality of containers 118, a gantry assembly, and a user interface 126. Differences between the two systems 10, 110 are described below.

The casing 114 includes a staging area 142 for accessing the containers 18. Similar to the staging area 42 described above, the illustrated staging area 142 includes a recess 146 formed in an outer surface of the casing 114 and a shelf 148 extending from the casing 114. In the illustrated embodiment, the staging area 142 is configured to simultaneously support up to thirteen containers 118. Operation of the gantry assembly and the user interface 126 to move the containers 118 between an interior storage area and the staging areas 142 is generally the same as the operation of the gantry assembly 22 and the user interface 26 discussed above. In other embodiments, the casing 114 may include multiple, discrete staging areas, each of which is configured to simultaneously support a plurality of containers 118.

Figure 7:
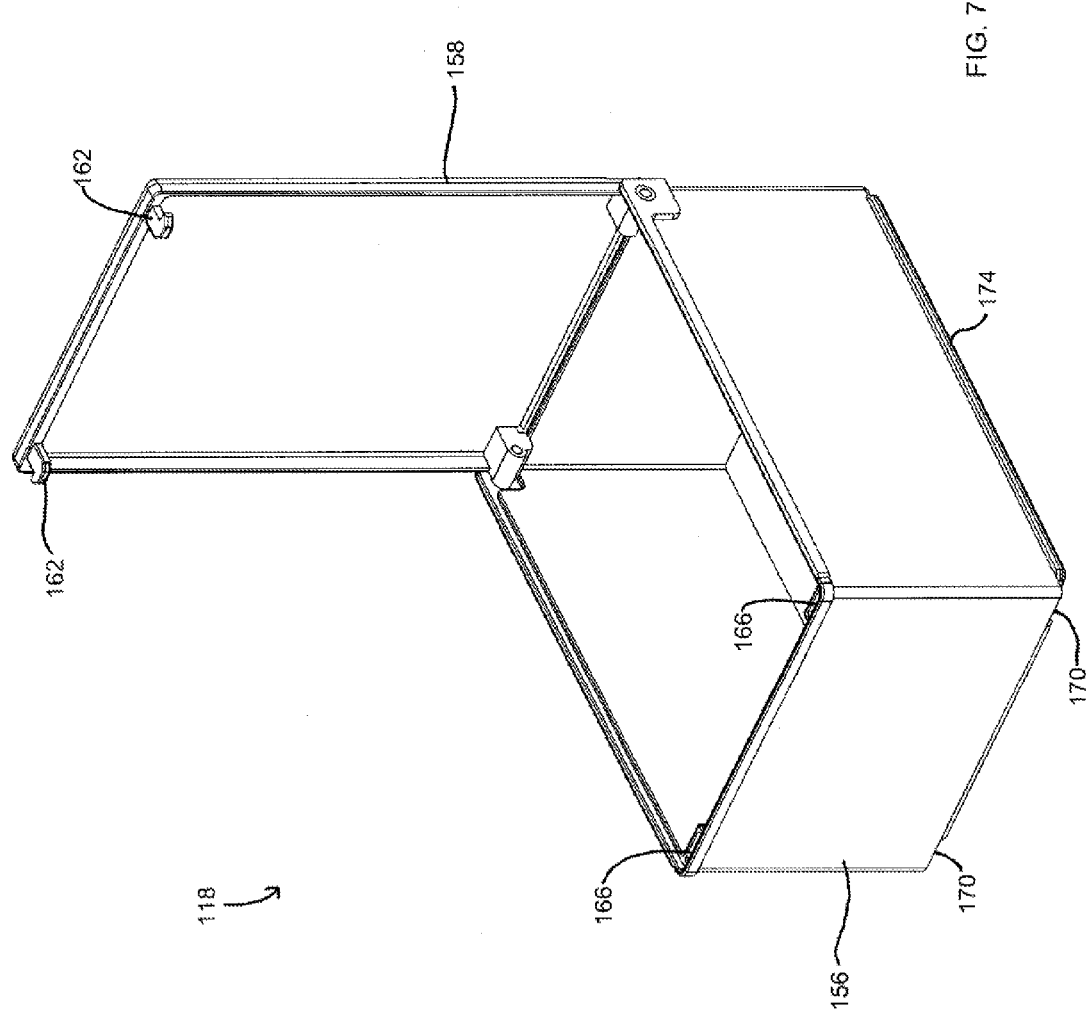
FIG. 7 is a perspective view of a container for use with the pharmaceutical storage and retrieval system of FIG. 6.

FIG. 7 illustrates one of the containers 118, or bins, in more detail. Similar to the container 18 described above, the illustrated container 118 includes a base portion 156 and a lid 158. In the illustrated embodiment, the lid 158 includes two latches 162 that are received in corresponding openings or slots 166 in the base portion 156. The latches 162 function as a lock mechanism to secure the lid 158 in a closed position. The latches 162 may be unlocked from the base portion 156 by an actuator mounted adjacent the staging areas 142 to allow the lid 158 to pivot to an open position. In some embodiments, the actuator may include a solenoid having projections that extend through openings 170 in a lower surface of the base portion 156 to unlock the latches 162. In other embodiments, more sophisticated and/or secure locking mechanisms may alternatively be employed.

The illustrated container 118 also includes two outwardly-extending flanges 174 (only one of which is shown) formed on the base portion 156. The flanges 174 are positioned adjacent the lower surface of the base portion 156 and extend along the length of the container 118. When the container is positioned in the staging area 142, the flanges 174 are received in corresponding grooves of the casing 114 via a tongue-and-groove mechanism. The flanges 174 thereby inhibit the container 118 from being lifted out of the staging area 142 and away from the system 110. The illustrated flange 174 is generally straight and planar, but may alternatively be dovetail-shaped, tapered, irregular, or the like. In other embodiments, other suitable structures may be employed to inhibit the container 118 from being removed from the staging area 142. For example, in some embodiments, the container 118 may include a pin that is received in a hole in the casing 114 (or vise versa). In further embodiments, other mechanisms, such as automated locks or latches, may be employed to selectively lock the container 118 to the casing 114 when the container is in the staging area 142.

Although the systems 10, 110 have been described above with reference pharmaceuticals, the systems 10, 110 may also be used to securely store and retrieve other types of small items, such as jewelry, coins, stamps, machine parts/tools, documents, or the like.

Furthermore, the systems 10, 110 may alternatively be implemented as self-service kiosks usable by a customer or staff member. The self-service kiosks could allow after-hours pick-up of pharmaceuticals or other items after verifying the identity of the user (e.g., via password, ID code, biometric identification, credit/debit card, etc.). For example, a staff member may fill the containers in the system 10, 110 with finished prescriptions (e.g., prescriptions that are already bagged). In some embodiments, a customer may then interact with the system 10, 110 directly to retrieve his or her prescription from the system 10, 110.

In other embodiments, the system 10, 110 may be located behind a counter or wall. In such embodiments, the customer may interact with an existing kiosk or interface located within a store. When a particular prescription is requested, the existing kiosk may communicate with the system 10, 110 and a separate machine (e.g., a robotic arm) may remove the prescription from the corresponding container. The machine can then place the prescription in a funnel or chute that directs the prescription into a dispenser, such as a bank drawer-type dispenser, for the customer. With this arrangement, the transaction with the customer (e.g., identification verification, credit/debit charging, receipts, etc.) can be directly managed by the retailer, rather than by the system 10, 110.

The size of the systems 10, 110 and/or of the containers 18, 118 within the systems 10, 110 may be scaled to store different numbers or types of items, as desired for specific applications.

Various features and advantages of the invention are set forth in the following claims.

The invention claimed is:

1. A storage and retrieval system comprising:
    a casing including an interior storage area and a staging area;
    a plurality of containers positioned in the interior storage area; and a gantry assembly positioned within the casing, the gantry assembly operable to move each of the plurality of containers between the interior storage area and the staging area, wherein every container positioned in the staging area is accessible to a user, and wherein a portion of each container positioned in the staging area is engaged by the casing to inhibit removal of each container from the casing through the staging area.

2. The system of claim 1, wherein the staging area is configured to receive the plurality of containers in a single layer, side-by-side arrangement.

3. The system of claim 1, wherein each container includes a flange that is engaged by the casing when the container is positioned in the staging area to inhibit removal of the container through the staging area.

4. The system of claim 3, wherein the flange is a first flange, wherein each container also includes a second flange that is engaged by the casing when the container is positioned in the staging area to inhibit removal of the container through the staging area.

5. The system of claim 4, wherein the first and second flanges extend outwardly from opposing sides of the container.

6. The system of claim 1, wherein each container includes a base portion and a lid, and wherein the lid is movable relative to the base portion to access an interior of the container.

7. The system of claim 6, wherein the base portion of each container includes a feature that is engaged by the casing to inhibit removal of the container through the staging area.

8. The system of claim 7, wherein the feature includes a flange extending along the base portion.

9. The system of claim 1, wherein the staging area includes a recess formed in an outer surface of the casing, and wherein the gantry assembly is operable to move each container into and out of the recess.

10. The system of claim 1, further comprising a sensor mounted to the casing adjacent the staging area, wherein the sensor identifies each container as the container is moved between the interior storage area and the staging area.

11. The system of claim 1, wherein the staging area simultaneously receives and supports at least eight containers to allow access to the at least eight containers.

12. The system of claim 1, wherein the plurality of containers is arranged in a plurality of rows and a plurality of columns within the casing.

13. A storage and retrieval system comprising:
a casing including an interior storage area and a staging area;
a plurality of containers positioned in the interior storage area; and
a gantry assembly positioned within the casing, the gantry assembly operable to move each of the plurality of containers between the interior storage area and the staging area,
wherein the plurality of containers is accessible to a user when positioned in the staging area, and wherein a portion of each container is engaged by the casing to inhibit removal of the container from the casing through the staging area,
wherein each container includes a base portion and a lid, and wherein the lid is movable relative to the base portion to access an interior of the container,
wherein each container further includes a lock mechanism to selectively secure the lid in a closed position, and further comprising an actuator mounted to the casing adjacent the staging area, and
wherein the actuator is operable to unlock the lock mechanism of each container when the container is positioned in the staging area.

14. The system of claim 1, further comprising a user interface coupled to the gantry assembly, wherein the user interface controls operation of the gantry assembly.

15. The system of claim 14, wherein the user interface is supported by the casing.

16. The system of claim 14, wherein the user interface tracks at least one of an amount of items and a type of items within each container.

17. The system of claim 14, wherein the user interface regulates which of the plurality of containers a particular user can access.

18. A storage and retrieval system comprising:
a casing including an interior storage area and a staging area;
a plurality of containers positioned in the interior storage area;
a gantry assembly positioned within the casing, the gantry assembly operable to move each of the plurality of containers between the interior storage area and the staging area;
wherein the plurality of containers is accessible to a user when positioned in the staging area, and wherein a portion of each container is engaged by the casing to inhibit removal of the container from the casing through the staging area,
wherein the staging area includes a recess formed in an outer surface of the casing,
wherein the gantry assembly is operable to move each container into and out of the recess, and
wherein the staging area further includes a shelf extending outwardly from the casing adjacent the recess.

19. A storage and retrieval system comprising:
a casing including an interior storage area and a staging area;
a plurality of containers positioned in the interior storage area; and
a gantry assembly positioned within the casing, the gantry assembly operable to move each of the plurality of containers between the interior storage area and the staging area,
wherein the plurality of containers is accessible to a user when positioned in the staging area, and wherein a portion of each container is engaged by the casing to inhibit removal of the container from the casing through the staging area, and
wherein each container includes a flange that is engaged by the casing when the container is positioned in the staging area to inhibit removal of the container through the staging area.

20. A storage and retrieval system comprising:
a casing including an interior storage area and a staging area;
a plurality of containers positioned in the interior storage area; and
a gantry assembly positioned within the casing, the gantry assembly operable to move each of the plurality of containers between the interior storage area and the staging area,
wherein the plurality of containers is accessible to a user when positioned in the staging area, and wherein a portion of each container is engaged by the casing to inhibit removal of the container from the casing through the staging area,
wherein each container includes a base portion and a lid, and wherein the lid is movable relative to the base portion to access an interior of the container,
wherein the base portion of each container includes a feature that is engaged by the casing to inhibit removal of the container through the staging area, and
wherein the feature includes a flange extending along the base portion.

\* \* \* \* \*